(12) United States Patent
Burton (10) Patent No.: US 8,797,669 B1
(45) Date of Patent: Aug. 5, 2014

(54) DISK DRIVE EXECUTING ROTATIONAL POSITION OPTIMIZATION (RPO) ALGORITHM TO FACILITATE A READ-MODIFY-WRITE OPERATION

(71) Applicant: Western Digital Technologies, Inc., Irvine, CA (US)

(72) Inventor: Scott E. Burton, Westminster, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/042,463

(22) Filed: Sep. 30, 2013

Related U.S. Application Data (60) Provisional application No. 61/872,000, filed on Aug. 30, 2013.

(51) Int. Cl.
*G11B 5/02* (2006.01)

(52) U.S. Cl.
USPC .................................. 360/55; 360/53; 360/39

(58) Field of Classification Search
None
See application file for complete search history.

(56) References Cited

U.S. PATENT DOCUMENTS

| | | | |
|---|---|---|---|
| 5,991,825 A | 11/1999 | Ng | |
| 6,324,604 B1 | 11/2001 | Don et al. | |
| 6,711,628 B1 | 3/2004 | Thelin | |
| 6,854,022 B1 | 2/2005 | Thelin | |
| 6,877,070 B2 | 4/2005 | Espeseth et al. | |
| 6,924,952 B1 | 8/2005 | Brunnett et al. | |
| 6,925,526 B2 | 8/2005 | Hall | |
| 7,061,714 B1 | 6/2006 | Yu | |
| 7,080,200 B2 | 7/2006 | Hassner et al. | |
| 7,114,029 B1 | 9/2006 | Thelin | |
| 7,120,737 B1 * | 10/2006 | Thelin ............................. 360/55 |
| 7,526,605 B2 | 4/2009 | Espeseth et al. | |
| 7,539,924 B1 | 5/2009 | Vasquez et al. | |
| 7,986,489 B2 | 7/2011 | Sumi et al. | |
| 8,024,515 B2 | 9/2011 | Auerbach et al. | |
| 8,285,965 B2 | 10/2012 | Karr et al. | |
| 8,433,977 B1 | 4/2013 | Vasquez et al. | |
| 8,560,759 B1 * | 10/2013 | Boyle et al. .................. 711/101 |
| 2003/0172229 A1 | 9/2003 | Takasugi et al. | |
| 2009/0313426 A1 | 12/2009 | See et al. | |
| 2010/0079904 A1 | 4/2010 | Sato | |

* cited by examiner

*Primary Examiner* — Muhammad N Edun (57) ABSTRACT

A disk drive is disclosed comprising a head actuated over a disk comprising a plurality of data tracks, wherein each data track comprises a plurality of data sectors. A host write command is received from a host, and previous data is read from at least one data sector which is combined with at least one of the host blocks to generate modified data that is written to the at least one data sector. At least one of a first read command and a first write command is generated, wherein the first read command is for reading the previous data from and the first write command is for writing the modified data to the at least one data sector. At least one of the first read command and the first write command is stored in a command queue for execution based on a rotational position optimization (RPO) algorithm.

16 Claims, 6 Drawing Sheets

DISK DRIVE EXECUTING ROTATIONAL POSITION OPTIMIZATION (RPO) ALGORITHM TO FACILITATE A READ-MODIFY-WRITE OPERATION

CROSS REFERENCE TO RELATED APPLICATION(S)

This application claims the benefit of U.S. Provisional Application No. 61/872,000, filed on Aug. 30, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
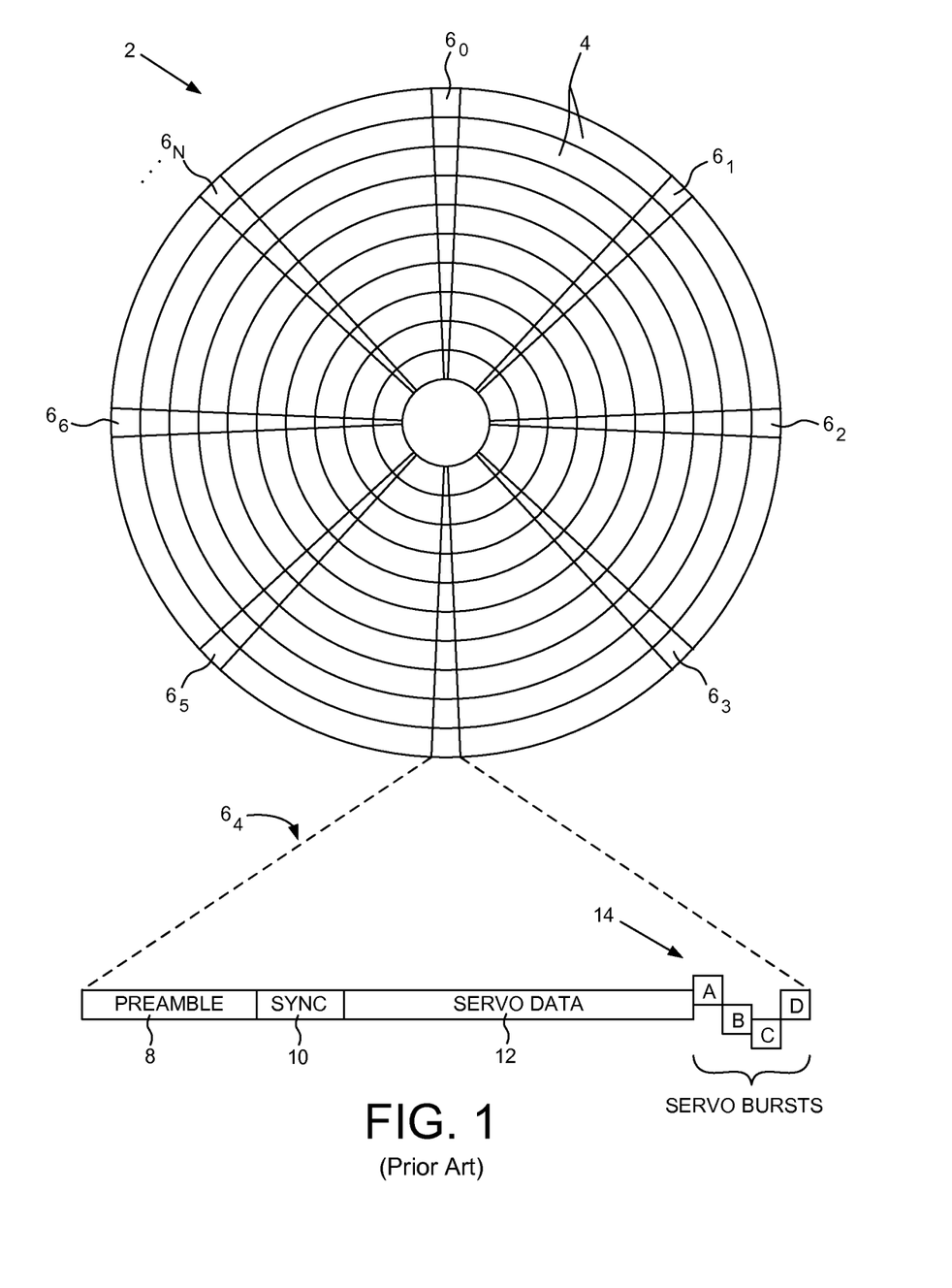
FIG. 1 shows a prior art disk format comprising servo tracks defined by servo sectors.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B, 2C:
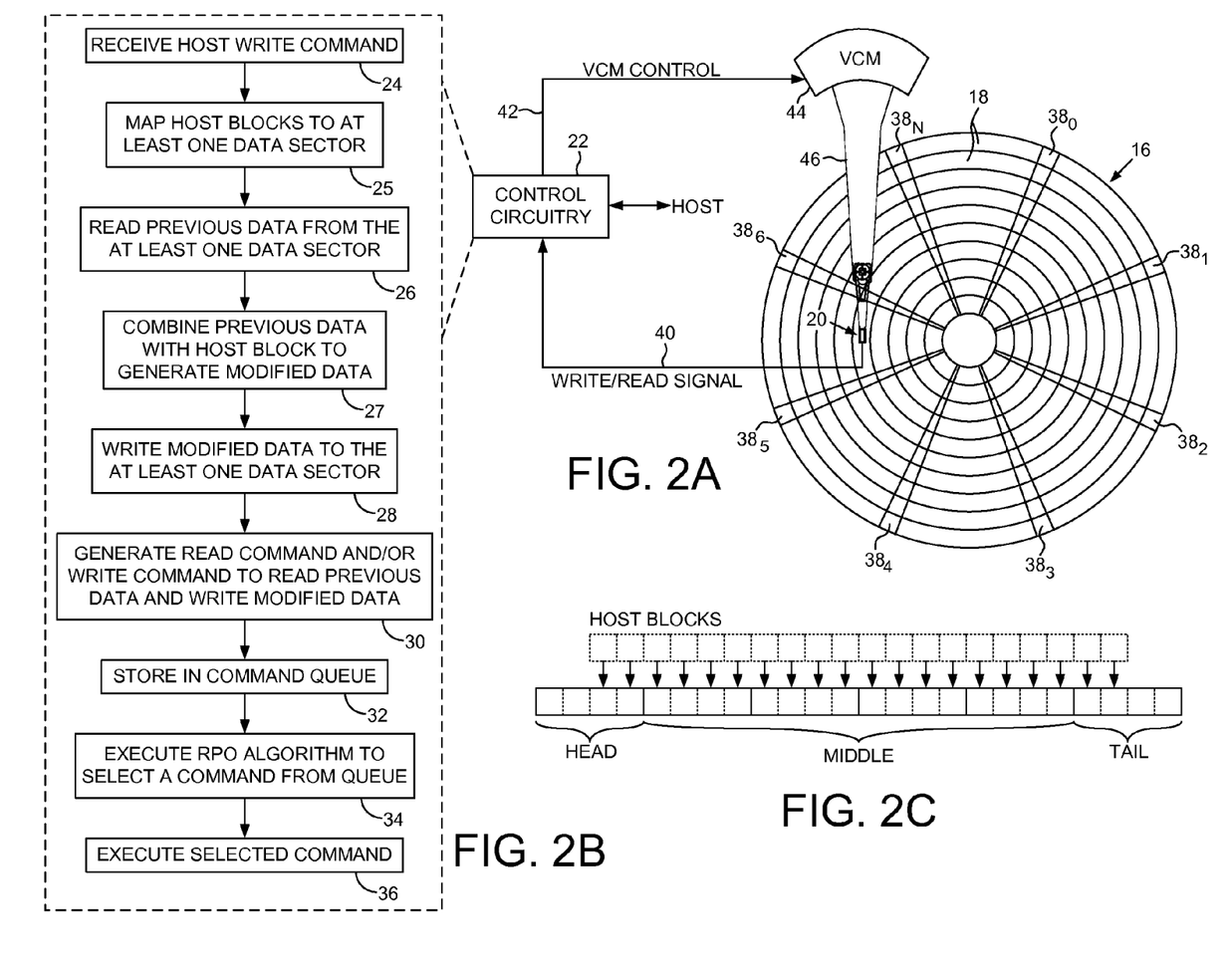
FIG. 2A shows a disk drive according to an embodiment comprising a head actuated over a disk.
FIG. 2B is a flow diagram according to an embodiment wherein when a misaligned host write command is received requiring a read-modify-write operation of at least one data sector, at least one of a read command and a write command is generated and inserted into a command queue and processed according to a rotational position optimization (RPO) algorithm.
FIG. 2C shows an example where a host write command is misaligned at a head data sector and a tail data sector.

FIG. 2A shows a disk drive according to an embodiment comprising a disk 16 comprising a plurality of data tracks 18, wherein each data track 18 comprises a plurality of data sectors. The disk drive further comprises a head 20 actuated over the disk 16, and control circuitry 22 operable to execute the flow diagram of FIG. 2B, wherein a host write command is received from a host (block 24), the host write command comprises a plurality of host blocks, and each data sector is capable of storing at least two host blocks. FIG. 2C shows an example embodiment wherein each data sector is capable of storing four host blocks, but a data sector may be capable of storing more or less host blocks. A plurality of the host blocks are mapped to at least one data sector (block 25). Previous data is read from the at least one data sector (block 26) and combined with at least one of the host blocks to generate modified data (block 27), wherein the modified data is written to the at least one data sector (block 28). At least one of a first read command and a first write command is generated (block 30), wherein the first read command is for reading the previous data from the at least one data sector and the first write command is for writing the modified data to the at least one data sector. At least one of the first read command and the first write command is stored in a command queue (block 32). A rotational position optimization (RPO) algorithm is executed to select a command from the command queue based on an access latency for each command in the command queue (block 34), and the selected command is executed (block 36).

In the embodiment of FIG. 2A, the disk 16 comprises a plurality of servo tracks defined by servo sectors $38_0$-$38_N$, wherein the data tracks 18 are defined relative to the servo tracks at the same or different radial density. The control circuitry 22 processes a read signal 40 emanating from the head 20 to demodulate the servo sectors $38_0$-$38_N$ and generate a position error signal (PES) representing an error between the actual position of the head and a target position relative to a target track. The control circuitry 22 filters the PES using a suitable compensation filter to generate a control signal 42 applied to a voice coil motor (VCM) 44 which rotates an actuator arm 46 about a pivot in order to actuate the head 20 radially over the disk 16 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern.

When processing disk access commands (e.g., host write and read commands), the access commands are stored in a command queue. The control circuitry then selects one of the access commands from the command queue based on the RPO algorithm that, in one embodiment, attempts to minimize the access latency for the disk drive. In one embodiment, the access latency comprises a seek latency required to seek the head to a target data track, together with a rotational latency of the disk before the head reaches the first data sector for the access command. Executing the access commands in the command queue based on RPO algorithm increases the performance of the disk drive as seen from the host.

Referring again to FIG. 2C, when a data sector is capable of storing multiple host blocks of a host write command (four host blocks per data sector in this example), the host blocks of a host write command may be misaligned with the data sectors on the disk. In the example of FIG. 2C, the host blocks of a host write command are mapped to six data sectors, including a head data sector, four middle data sectors, and a tail data sector. Also in the example of FIG. 2C, the host blocks are misaligned with the data sectors both at the head data sector and the tail data sector. That is, the first two host blocks are mapped to a second part of the head data sector, and the last two host blocks are mapped to a first part of the tail data sector. In one embodiment, the control circuitry 22 is unable to write host blocks to only part of a data sector, and therefore the control circuitry 22 may execute a read-modify-write operation on either or both of the head and tail data sectors. Referring to the head data sector in FIG. 2C, before writing the first two host blocks the control circuitry 22 first reads the previously written data from the head data sector, combines the first part of the previous data with the first two host blocks to generate modified data, and then writes the modified data back to the head data sector (read-modify-write). A similar read-modify-write operation may also be performed on the tail data sector if there is a similar misalignment of the host blocks with the tail data sector (such as shown in FIG. 2C).

If the read-modify-write operations for a misaligned host write command are executed as an atomic operation when executing the host write command, there is a reduction in performance due to the additional disk revolution. Referring to the example of FIG. 2C, the previous data may be read from the head data sector and the tail data sector during a first disk revolution, the previous data combined with the corresponding host blocks, and then all of the data sectors of the host write command written during a second disk revolution. During this atomic write operation, other commands in the command queue are not executed. Accordingly, in one embodiment in order to improve performance of the disk drive, the read and/or write commands generated as part of the read-modify-write operations are inserted into the command queue and processed according to the RPO algorithm rather than executed as an atomic operation when executing the host write command.

Figure 3A:
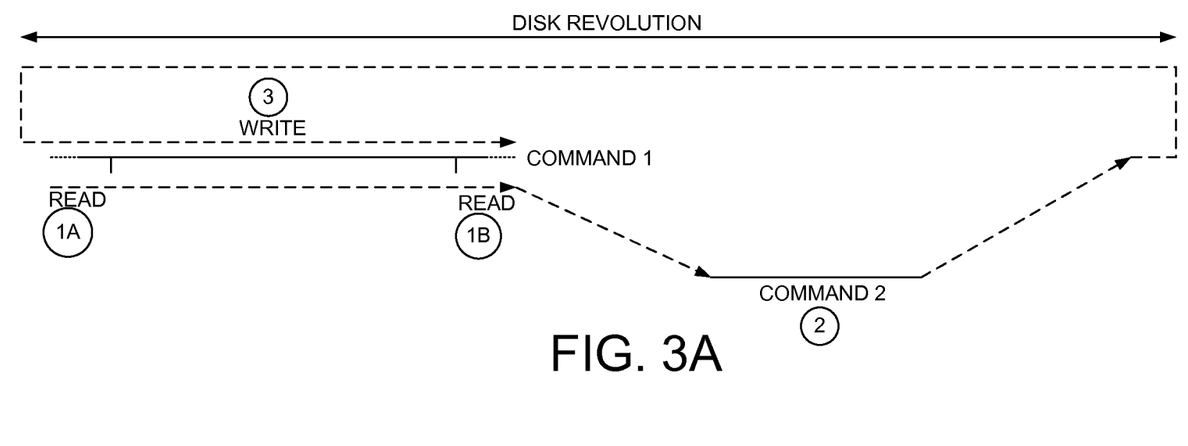
FIG. 3A shows an example wherein when processing a misaligned host write command, a read command is generated to read previous data from both the head and tail data sectors, wherein the read command is processed according to the RPO algorithm.
Figure 4A:
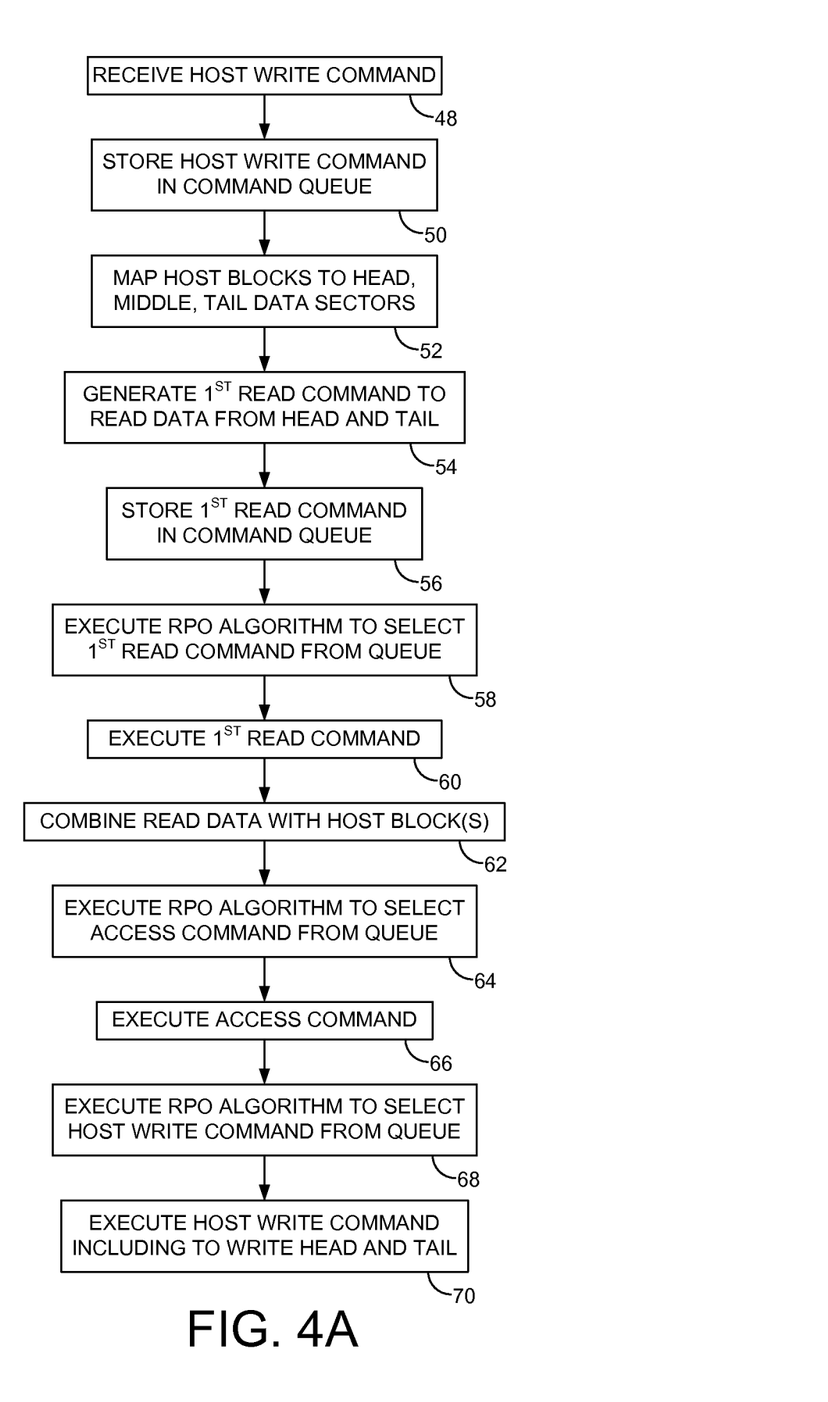
FIG. 4A is a flow diagram that corresponds to the embodiment shown in FIG. 3A.

FIG. 3A shows an example of this embodiment which is understood with reference to the flow diagram of FIG. 4A, wherein the control circuitry receives a misaligned host write command COMMAND 1 that is misaligned at both the head data sector and the tail data sector (block 48). The host write command COMMAND 1 is stored in the command queue (block 50), and the host blocks of the host write command are mapped to data sectors on the disk (block 52). A first read command is generated to read the previous data from the head data sector and the tail data sector (block 54), and the first read command is stored in the command queue (block 56). When the first read command is selected from the command queue based on the RPO algorithm during a first disk revolution (block 58), the control circuitry executes the first read command to read the previous data from the head data sector (1A) and to read the previous data from the tail data sector (1B) (block 60), wherein the previous data is combined with the corresponding host blocks to generate modified data (block 62). The control circuitry may then select COMMAND 2 from the command queue based on the RPO algorithm (block 64), wherein COMMAND 2 is a read or write command different from the host write command COMMAND 1. The control circuitry executes the COMMAND 2 (2) during the first disk revolution (block 66), and then selects the host write command COMMAND 1 from the command queue based on the RPO algorithm (block 68). During a second disk revolution, the control circuitry executes the host write command COMMAND 1 (3), including to write the modified data to the head and tail data sectors (block 70). In this example, the performance of the disk drive improves due to executing COMMAND 2 during the first disk revolution.

In other embodiments, there may be more than one access command executed between the first read command (1A and 1B) and the host write command COMMAND 1 (3). In addition, the control circuitry may select a number of access commands from the command queue that require multiple disk revolutions to execute before executing the host write command COMMAND 1. That is, after executing the first read command to read the data from the head and tail data sectors of COMMAND 1, the control circuitry may execute the access commands remaining in the command queue in any suitable order, which may mean waiting multiple disk revolutions before the host write command COMMAND 1 is selected for execution.

Figure 3B:
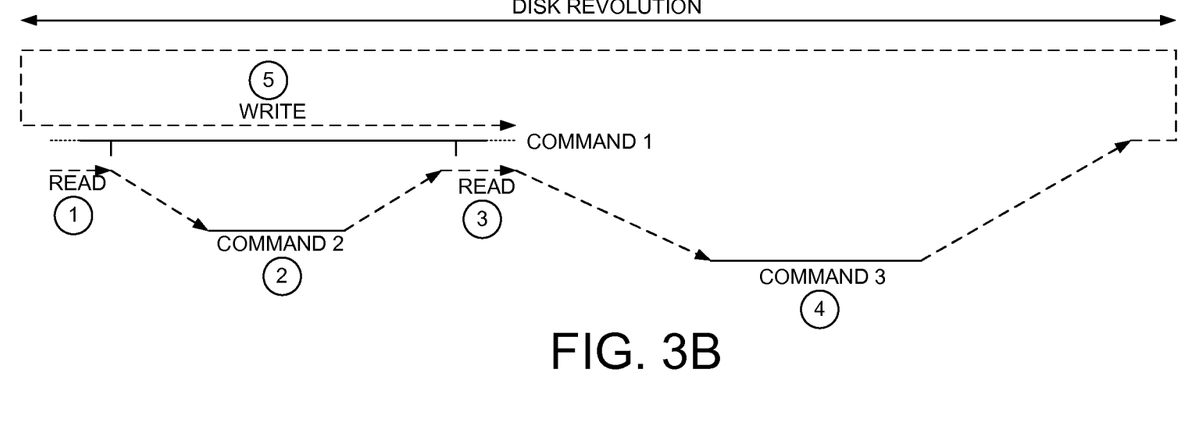
FIG. 3B shows an example wherein when processing a misaligned host write command, a first read command is generated to read previous data from the head data sector and a second read command is generated to read previous data from the tail data sector, wherein the first and second read commands are processed according to the RPO algorithm.
Figure 4B:
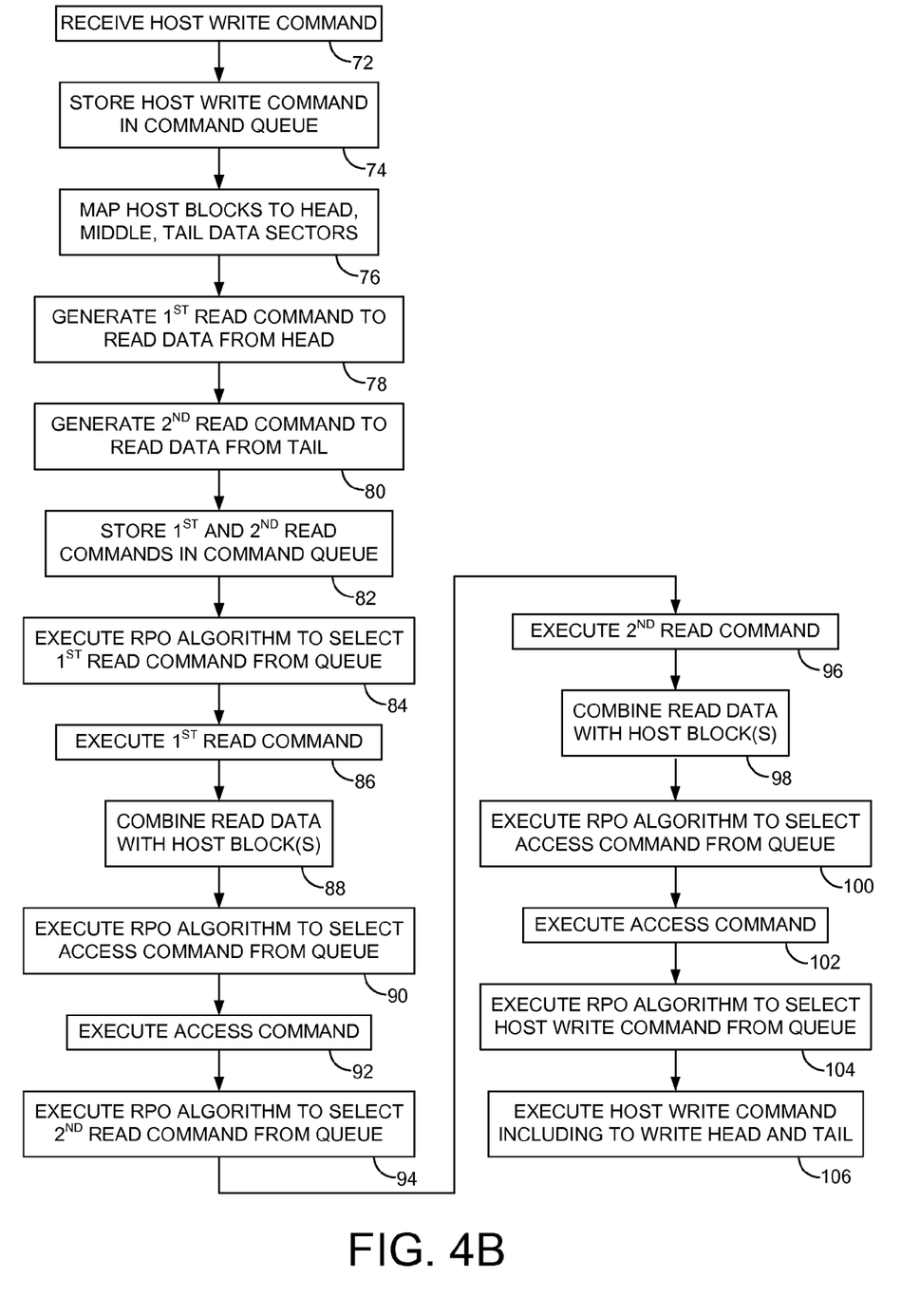
FIG. 4B is a flow diagram that corresponds to the embodiment shown in FIG. 3B.

FIG. 3B shows another embodiment which is understood with reference to the flow diagram of FIG. 4B, wherein the control circuitry receives a misaligned host write command COMMAND 1 that is misaligned at both the head data sector and the tail data sector (block 72). The host write command COMMAND 1 is stored in the command queue (block 74), and the host blocks of the host write command are mapped to data sectors on the disk (block 76). A first read command is generated to read the previous data from the head data sector (block 78), a second read command is generated to read the previous data from the tail data sector (block 80), and the first and second read commands are stored in the command queue (block 82) and executed in an order based on the RPO algorithm. Assuming the first read command is selected from the command queue based on the RPO algorithm during a first disk revolution (block 84), the control circuitry executes the first read command (1) to read the previous data from the head data sector (block 86), wherein the previous data is combined with the corresponding host blocks to generate modified data (block 88). The control circuitry may then select COMMAND 2 from the command queue based on the RPO algorithm (block 90), wherein COMMAND 2 is a read or write command different from the host write command COMMAND 1. The control circuitry executes the COMMAND 2 (2) during the first disk revolution (block 92), and then selects the second read command from the command queue based on the RPO algorithm (block 94). The control circuitry executes the second read command (3) during the first disk revolution to read the previous data from the tail data sector (block 96), wherein the previous data is combined with the corresponding host blocks to generate modified data (block 98). The control circuitry may then select COMMAND 3 from the command queue based on the RPO algorithm (block 100), wherein COMMAND 3 is a read or write command different from the host write command COMMAND 1. The control circuitry executes the COMMAND 3 (4) during the first disk revolution (block 102), and then the control circuitry selects the host write command COMMAND 1 from the command queue based on the RPO algorithm (block 104). During a second disk revolution, the control circuitry executes the host write command COMMAND 1 (5), including to write the modified data to the head and tail data sectors (block 106). In this example, the performance of the disk drive improves due to executing COMMAND 2 and COMMAND 3 during the first disk revolution.

In other embodiments, there may be more than one access command executed between the first read command (1) and the second read command (3), or there may be more than one access command executed between the second read command (3) and the host write command COMMAND 1 (5). In addition, the control circuitry may select a number of access commands from the command queue that require multiple disk revolutions to execute before executing the second read command and/or the host write command COMMAND 1. That is, after executing the first read command to read the data from the head data sector of COMMAND 1, the control circuitry may execute the access commands remaining in the command queue in any suitable order, which may mean waiting multiple disk revolutions before the second read command and/or the host write command COMMAND 1 is selected for execution. In yet another example, the RPO algorithm may select the second read command to read the previous data from the tail data sector before selecting the first read command to read the previous data from the head data sector. That is, the commands stored in the command queue, including the read and/or write commands generated for a read-modify-write of the head and tail data sectors, may be executed in any suitable order as determined by the RPO algorithm.

In one embodiment, the read command for reading previous data from the tail data sector may be generated after the corresponding write command has already started. For example, in one embodiment the control circuitry may receive multiple host write commands wherein the data blocks of the write commands are mapped to sequential data sectors. As the control circuitry receives the host write commands, the sequential host blocks may be combined into a sequential write command. When the sequential write command is executed, the control circuitry may receive additional host write commands that are sequential with the current write command. The control circuitry may continue to append the host blocks to the current write command so they are written in a sequential sequence. In this embodiment, the control circuitry may not be aware of the last data sector in the sequence until the control circuitry receives the last host write command in the sequence. When the last host write command in the sequence is received, the host blocks at the tail may be misaligned with the tail data sector. Accordingly, in one embodiment the read and/or write commands associated with the read-modify-write of the tail data sector may be executed according to the RPO algorithm.

Figure 5A:
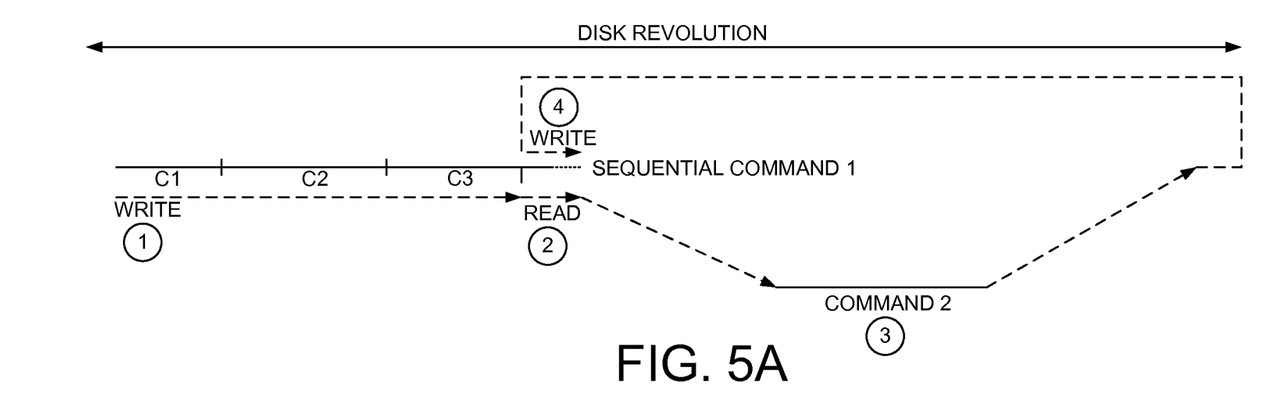
FIG. 5A shows an example wherein when processing sequential host write commands with a misalignment at the end of the write sequence, data is read from the tail data sector to generate modified data, a write command is generated to write the modified data back to the tail data sector, and the write command is processed according to the RPO algorithm.

FIG. 5A illustrates an example of this embodiment wherein the control circuitry receives a plurality of host write commands (C1, C2, C3) having host blocks that are mapped to sequential data sectors. The host blocks of the host write commands are combined to generate a sequential write command COMMAND 1. During a first disk revolution, the sequential write command COMMAND 1 (1) is executed to write host blocks to the head data sector and the middle data sectors, and after writing the host blocks to the middle data sectors, previous data is read (2) from the tail data sector to generate the modified data (without writing the last host block(s) to the tail data sector). A first write command is generated to write the modified data which includes the last host block(s) to the tail data sector. The first write command is stored in the command queue, and an access command COMMAND 2 is selected from the command queue based on the RPO algorithm. During the first disk revolution, the access command COMMAND 2 (3) is executed, and then the first write command is selected from the command queue based on the RPO algorithm. The first write command (4) is then executed during a second disk revolution in order to write the modified data to the tail data sector. In this example, the performance of the disk drive improves due to executing COMMAND 2 during the first disk revolution.

Figure 5B:
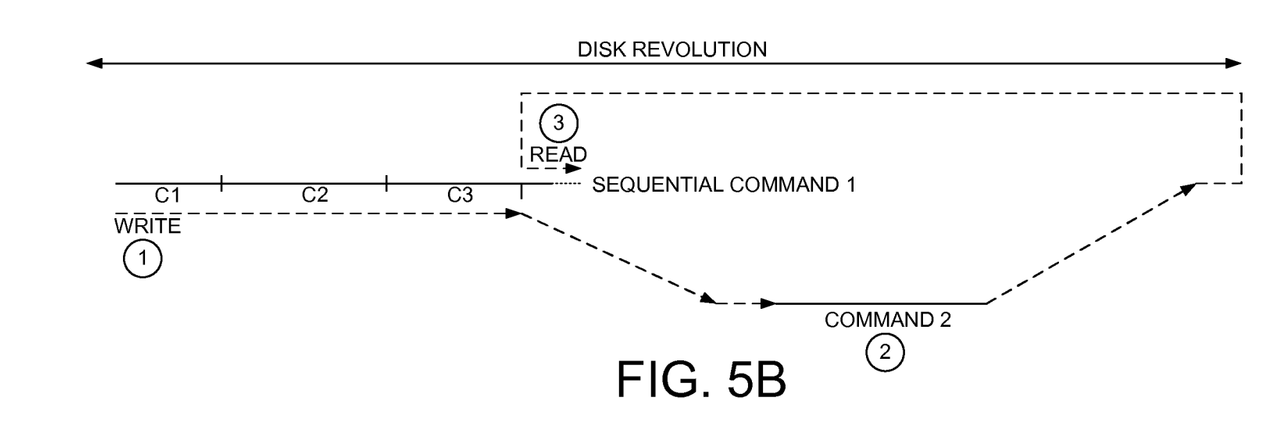
FIG. 5B shows an example wherein when processing sequential host write commands with a misalignment at the end of the write sequence, a read command for reading previous data from the tail data sector is generated and processed according to the RPO algorithm.

Referring again to the read operation (2) in FIG. 5A, in one embodiment the control circuitry may be unable to switch from writing a current data sector to reading the next data sector. Accordingly, in one embodiment the control circuitry may generate a read command in order to perform the read operation (2) of FIG. 5A, wherein the read command may be processed based on the RPO algorithm. FIG. 5B shows an example of this embodiment wherein after writing the middle data sectors for the sequential write command COMMAND 1 up to the tail data sector, the control circuitry generates a read command for reading the previous data from the tail data sector, wherein the read command is inserted into the command queue. The control circuitry then selects and executes COMMAND 2 (2) based on the RPO algorithm during the same disk revolution. The control circuitry may then select the read command from the command queue based on the RPO algorithm, and execute the read command (3) during a second disk revolution. In one embodiment, the control circuitry may generate a write command for the tail data sector in order to write the modified data which includes the last host block(s) of COMMAND 1 to the tail data sector, wherein the write command may be inserted into the command queue for execution based on the RPO algorithm.

In the example embodiments of FIGS. 5A and 5B, the head data sector of the combined write command (i.e., the first data sector of command C1) may be misaligned with the host blocks. Accordingly, in one embodiment the control circuitry may generate the read and write commands in order to perform the read-modify-write of the head data sector, wherein the generated read and/or write commands may be executed based on the RPO algorithm as described above.

There may be other embodiments where the read and/or write command associated with the tail data sector may be generated after the corresponding write command has already started (i.e., after writing data to at least the head data sector). For example, in one embodiment there may not be enough resources to execute a large write command, in which case the large write command may be executed in segments. In this embodiment, the head data sector may be written using the above-described read-modify-write operation in connection with executing the first segment of the large write command. The tail data sector may then be written using the above-described read-modify-write operation in connection with executing the last segment of the large write command. In yet another embodiment, a write command may extend across a zone boundary on the same disk surface or even extend across to a different disk surface such that it may be more efficient to execute the write command in segments. In this embodiment, the head data sector may be written using the read-modify-write when executing the first segment of the write command, and the tail segment may be written using the read-modify-write when executing the last segment of the write command. In both of these embodiments, the read and/or write command for executing the read-modify-write of the tail data sector may be generated after the corresponding write command has already started (i.e., after writing data to at least the head data sector), whereas in FIG. 3A the read commands for both the head and tail data sector are generated and processed according to the RPO algorithm prior to starting the corresponding write command.

Referring again to the example of FIG. 3A, if the control circuitry is able to switch between writing a current data sector to reading the next data sector, in one embodiment the host write command COMMAND 1 may be executed in segments. During a first disk revolution, the previous data may be read from the head data sector, then the host blocks of the host write command COMMAND 1 may be written to the middle data sectors, and then the previous data may be read from the tail data sector. When the previous data is read from the head data sector, it is combined with at least one of the beginning host blocks to generate the modified data, and a corresponding first write command generated and inserted into the command queue. Similarly, when the previous data is read from the tail data sector, it is combined with at least one of the ending host blocks to generate the modified data, and a corresponding second write command generated and inserted into the command queue. The first and second write commands may then be executed in any suitable order based on the RPO algorithm in order to complete the write command COMMAND 1.

In the example embodiment shown in FIG. 2C, the host blocks of the host write command spans multiple data sectors including a head data sector, middle data sectors, and a tail data sector. In other embodiments, the host blocks of a host write command may span only two data sectors (i.e., only a head and tail data sector), and in yet another embodiment, the host blocks of a host write command may be written to a single data sector. In both of these embodiments, the control circuitry may still need to perform a read-modify-write of at least one of the data sectors due to a misalignment of the host blocks, and therefore the control circuitry may execute at least one of the read and/or write commands of the read-modify-write operation according to the RPO algorithm as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a plurality of data tracks, wherein each data track comprises a plurality of data sectors;
   a head actuated over the disk; and
   control circuitry operable to:
   receive a host write command from a host, wherein the host write command comprises a plurality of host blocks, and each data sector is capable of storing at least two host blocks;
   map a plurality of the host blocks to at least one data sector;
   read previous data from the at least one data sector;
   combine the previous data with at least one of the host blocks to generate modified data;
   write the modified data to the at least one data sector;
   generate at least one of a first read command and a first write command, wherein the first read command is for reading the previous data from the at least one data sector and the first write command is for writing the modified data to the at least one data sector;
   store at least one of the first read command and the first write command in a command queue;
   execute a rotational position optimization (RPO) algorithm to select a command from the command queue based on an access latency for each command in the command queue; and
   execute the selected command.

2. The disk drive as recited in claim 1, wherein the at least one data sector comprises a head data sector and a tail data sector, and the control circuitry is further operable to generate the first read command to read the previous data from at least one of the head data sector and the tail data sector.

3. The disk drive as recited in claim 2, wherein the control circuitry is further operable to generate the first read command to read the previous data from both the head data sector and the tail data sector.

4. The disk drive as recited in claim 2, wherein the control circuitry is further operable to:
generate the first read command to read first previous data from the head data sector;
generate a second read command to read second previous data from the tail data sector;
store the first and second read commands in the command queue; and
execute the RPO algorithm to select the first and second read commands from the command queue.

5. The disk drive as recited in claim 2, wherein the control circuitry is further operable to:
when the selected command is the first read command, read the previous data from at least one of the head data sector and the tail data sector; and
write the modified data to at least one of the head data sector and the tail data sector.

6. The disk drive as recited in claim 5, wherein the control circuitry is further operable to:
store the host write command in the command queue; and
write the modified data to at least one of the head data sector and the tail data sector when the host write command is selected from the command queue.

7. The disk drive as recited in claim 2, wherein the control circuitry is further operable to:
write at least one host block to the head data sector;
after writing the at least one host block to the head data sector, read the previous data from the tail data sector;
generate the first write command to write the modified data to the tail data sector;
store the first write command in the command queue; and
execute the RPO algorithm to select the first write command from the command queue.

8. The disk drive as recited in claim 7, wherein after writing the at least one host block to the head data sector, the control circuitry is further operable to:
generate the first read command to read the previous data from the tail data sector;
store the first read command in the command queue; and
execute the RPO algorithm to select the first read command from the command queue.

9. A method of operating a disk drive comprising:
receiving a host write command from a host to write a plurality of host blocks to a disk comprising a plurality of data tracks, wherein each data track comprises a plurality of data sectors, and each data sector is capable of storing at least two host blocks;
mapping a plurality of the host blocks to at least one data sector;
reading previous data from the at least one data sector;
combining the previous data with at least one of the host blocks to generate modified data;
writing the modified data to the at least one data sector;
generating at least one of a first read command and a first write command, wherein the first read command is for reading the previous data from the at least one data sector and the first write command is for writing the modified data to the at least one data sector;
storing at least one of the first read command and the first write command in a command queue;
executing a rotational position optimization (RPO) algorithm to select a command from the command queue based on an access latency for each command in the command queue; and
executing the selected command.

10. The method as recited in claim 9, wherein the at least one data sector comprises a head data sector and a tail data sector, and the method further comprises generating the first read command to read the previous data from at least one of the head data sector and the tail data sector.

11. The method as recited in claim 10, further comprising generating the first read command to read the previous data from both the head data sector and the tail data sector.

12. The method as recited in claim 10, further comprising:
generating the first read command to read first previous data from the head data sector;
generating a second read command to read second previous data from the tail data sector;
storing the first and second read commands in the command queue; and
executing the RPO algorithm to select the first and second read commands from the command queue.

13. The method as recited in claim 10, further comprising:
when the selected command is the first read command, read the previous data from at least one of the head data sector and the tail data sector; and
write the modified data to at least one of the head data sector and the tail data sector.

14. The method as recited in claim 13, further comprising:
storing the host write command in the command queue; and
writing the modified data to at least one of the head data sector and the tail data sector when the host write command is selected from the command queue.

15. The method as recited in claim 10, further comprising:
writing at least one host block to the head data sector;
after writing the at least one host block to the head data sector, reading the previous data from the tail data sector;
generating the first write command to write the modified data to the tail data sector;
storing the first write command in the command queue; and
executing the RPO algorithm to select the first write command from the command queue.

16. The method as recited in claim 15, wherein after writing the at least one host block to the head data sector, the method further comprising:
generating the first read command to read the previous data from the tail data sector;
storing the first read command in the command queue; and
executing the RPO algorithm to select the first read command from the command queue.

* * * * *